US012792685B2

(12) United States Patent
Krellner

(10) Patent No.: US 12,792,685 B2
(45) Date of Patent: Nov. 10, 2026

(54) ITERATIVE QUANTUM ANNEALING

(71) Applicant: SAP SE, Walldorf (DE)

(72) Inventor: Florian Krellner, Nuremberg (DE)

(73) Assignee: SAP SE, Walldorf (DE)

( * ) Notice: Subject to any disclaimer, the term of this patent is extended or adjusted under 35 U.S.C. 154(b) by 1074 days.

(21) Appl. No.: 17/959,105

(22) Filed: Oct. 3, 2022

(65) Prior Publication Data

US 2024/0126834 A1 Apr. 18, 2024

(51) Int. Cl.
*G06F 17/11* (2006.01)
*G06F 17/16* (2006.01)
*G06N 10/60* (2022.01)

(52) U.S. Cl.
CPC ............. *G06F 17/11* (2013.01); *G06N 10/60* (2022.01); *G06F 17/16* (2013.01)

(58) Field of Classification Search
CPC ........ G06N 10/40; G06N 10/60; G06F 17/11; G06F 17/16
See application file for complete search history.

(56) References Cited

U.S. PATENT DOCUMENTS

2017/0242824 A1* 8/2017 Karimi .................... G06F 17/11
2021/0303704 A1* 9/2021 Chen ........................ G06N 5/01
2022/0389414 A1* 12/2022 Aspuru-Guzik ..... G06N 99/007
2023/0325461 A1* 10/2023 Dudash .................. G06N 10/60 708/446
2024/0127122 A1* 4/2024 Ide ......................... G06N 20/10

FOREIGN PATENT DOCUMENTS

EP 3893168 A1 10/2021
WO WO2022087535 A1 4/2022

OTHER PUBLICATIONS

Extended European Search Report dated Feb. 12, 2024, for EP Application No. 23193828.3, 13 pages.

* cited by examiner

*Primary Examiner* — Emily E Larocque
(74) *Attorney, Agent, or Firm* — Fountainhead Law Group, PC

(57) ABSTRACT

Embodiments implement iterative quantum annealing to provide a solution of an optimization. An annealing engine is located upstream of a quantum annealer (or a digital annealer, simulated annealer, or classical solver). The annealing engine is configured to process an initial solution to an original Quadratic Unconstrained Binary Optimization (QUBO) model, and thereby construct a second QUBO model. The second model is then fed to the quantum annealer, which returns a computed solution. The annealing engine constructs an intermediate solution from the computed solution and the second QUBO model. If the annealing engine determines a stopping criterion is satisfied by the intermediate solution, a final solution is constructed therefrom. If the annealing engine determines the stopping criterion is not satisfied, the second QUBO model is overwritten with the intermediate solution to form the basis for another iteration of QUBO model creation, quantum annealing, and evaluation of satisfaction of the stopping criterion.

20 Claims, 5 Drawing Sheets

ITERATIVE QUANTUM ANNEALING

BACKGROUND

Unless otherwise indicated herein, the approaches described in this section are not prior art to the claims in this application and are not admitted to be prior art by inclusion in this section.

Quantum computing approaches leverage quantum mechanical behavior in order to perform certain operations. For example, quantum computing may be useful in performing an optimization.

SUMMARY

Embodiments implement iterative quantum annealing to provide a solution of an optimization. An annealing engine is located upstream of a quantum annealer (or a digital annealer, simulated annealer, or classical solver). The annealing engine is configured to process an initial solution to an original Quadratic Unconstrained Binary Optimization (QUBO) model, and thereby construct a second QUBO model. The second model is then fed to the quantum annealer, which returns a computed solution. The annealing engine constructs an intermediate solution from the computed solution and the second QUBO model. If the annealing engine determines a stopping criterion is satisfied by the intermediate solution, a final solution is constructed therefrom. If the annealing engine determines the stopping criterion is not satisfied, the second QUBO model is overwritten with the intermediate solution to form the basis for another iteration of QUBO model creation, quantum annealing, and evaluation of satisfaction of the stopping criterion.

The following detailed description and accompanying drawings provide a better understanding of the nature and advantages of various embodiments.

DETAILED DESCRIPTION

Described herein are methods and apparatuses that implement iterative quantum annealing. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

One type of quantum computing, is quantum annealing. Quantum annealing is an optimization process that exploits the nature of quantum mechanics to find the global minima of a Quadratic Unconstrained Binary Optimization (QUBO):

$$\min\{x^T Qx : x \in \{0,1\}^n\},\ \text{for a matrix } Q \in \mathbb{R}^{n,n}.$$

Due to its expressiveness and close relation to the Ising model, a QUBO is used as the de facto standard interface for quantum annealing.

Quantum annealing may offer exponential speed up to classical methods. As implemented in practice, quantum annealing may be considered to be a heuristic. That is, quantum annealing offers a solution that is valuable, but may not be guaranteed as optimal.

Quantum annealing does not support warm starting. That is, quantum annealing does not accept an initial solution and improve it further. Rather, quantum annealing starts from scratch. Such lack of support for a warm start can pose issues in attempting to combine classical methods or procedures and quantum annealing.

In addition, one cannot apply quantum annealing iteratively in order to solve combinatorial optimization problems. This can undesirably restrict the usage and application of quantum annealing.

In order to avoid these issues and render quantum annealing more useful, embodiments derive an iterative approach to solve QUBOs with quantum annealing and an initial solution. In particular, given an initial solution, embodiments construct a QUBO that computes a delta to that current solution with quantum annealing. This procedure can then be used iteratively and in combination with classical methods or procedures.

Figure 1:
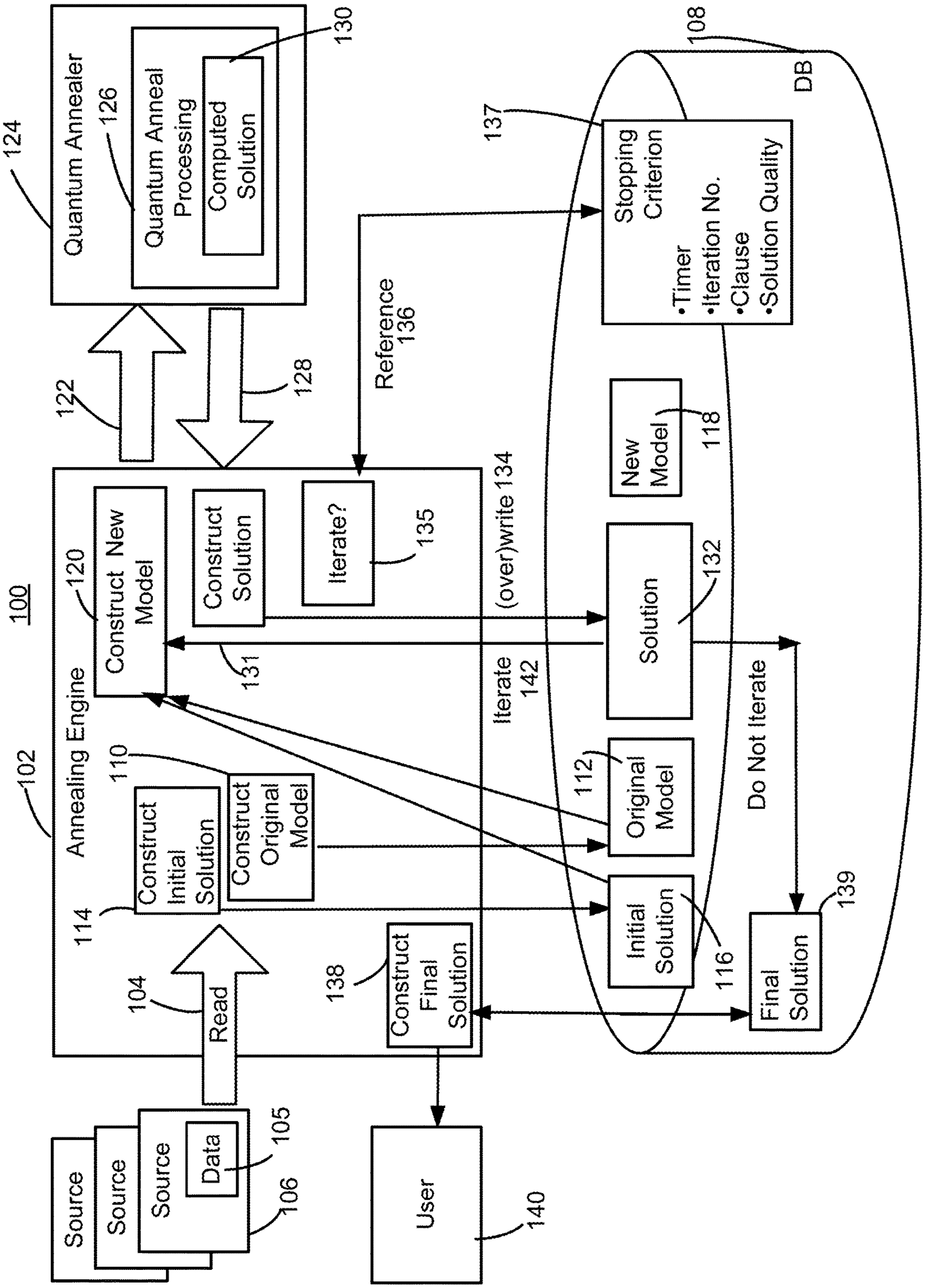
FIG. 1 shows a simplified diagram of a system according to an embodiment.

FIG. 1 shows a simplified view of an example system that is configured to implement iterative quantum annealing according to an embodiment. Specifically, system 100 comprises an annealing engine 102 that is configured to read 104 selected data 105 available from one or more sources 106.

The annealing engine is in communication with a non-transitory computer readable storage medium 108, which may comprise a database. That storage medium may receive and retain data that is read from source(s) by the annealing engine.

In certain embodiments, that stored data may be referenced by the annealing engine in order to construct 110 an original optimization model 112. For the case of a QUBO model, a matrix may be constructed by the engine.

While FIG. 1 shows the engine constructing the original optimization model, this is not required. According to certain embodiments an already-existing original optimization model may be available for reading from a source and for retention in the storage medium.

Stored data that has been selected and read from source (s), may also be used in constructing 114 an initial solution 116 to the optimization. Again, however, in alternative embodiments the initial solution may already be available from source(s) for import and reference by the annealing engine (rather than being constructed).

Based upon the original optimization model and the initial solution, a new QUBO model 118 is constructed 120. Such construction of a QUBO model is described in detail below.

The constructed new model is then sent 122 to a quantum annealer 124 for processing 126. The quantum annealer can take various forms.

A quantum annealer can be dedicated hardware. Digital annealers and classical solvers (e.g., the Gurobi Optimizer) are also possible. Alternatively, a procedure could implement simulated quantum annealing.

The quantum annealer executes the QUBO based upon quantum mechanical behavior (actual and/or simulated). The quantum annealer then sends 128 its computed solution 130 back the annealing engine.

The annealing engine constructs 131 a first solution 132 from the initial solution and the computed solution returned by the quantum annealer. The first solution is then written 134 to the storage medium.

The annealing engine then determines 135 whether another iteration of new model generation is appropriate. That is, the first solution may be acceptable, or may be further improved.

The decision by the annealing engine as to whether or not to perform another iteration of new model generation, can reference 135 one or more stopping criterion 137.

Examples of stopping criterion can include, but are not limited to, one or more of:

a (fixed) number of iterations;

a time limit;

a no-progress clause (e.g., including a solution quality).

If it is determined that the solution should not be further improved, then no further iterations with the quantum annealer take place. The annealing engine constructs 138 a final solution 139 for storage.

More specifically, the first computed solution returned by the quantum annealer, and the solution constructed therefrom, may be in mathematical form (e.g., a vector). By contrast, the final solution generated from the solution may represent a user-intelligible parameters regarding the optimization.

Illustration of this is further discussed in the example below, which involves optimization of vehicle delivery routes. While the computed solution returned by the quantum annealer could be in the form of a mathematical vector, the final solution that is ultimately returned to a user 140 (application or human), could be in the form of optimized geographic vehicle routes (physical locations and roads connecting them).

The annealing engine may determine that the first solution should be improved. Under these circumstances, the annealing engine performs another iteration 142 of model generation referencing the first constructed solution (which may have superseded the initial solution, e.g. by overwriting the initial solution in the storage medium).

During that next iteration, the annealing engine constructs the newest model for quantum annealing from latest constructed solution and from the original model. That newest model is again forwarded to the quantum annealer for processing.

The resulting second computed solution is returned to the annealing engine for handling (construction of another new solution, further iteration determination). Such iterating can continue until a determination is ultimately made (e.g., by the quantum annealer referencing a stopping criterion) to construct a final solution for communication to the user.

Figure 2:
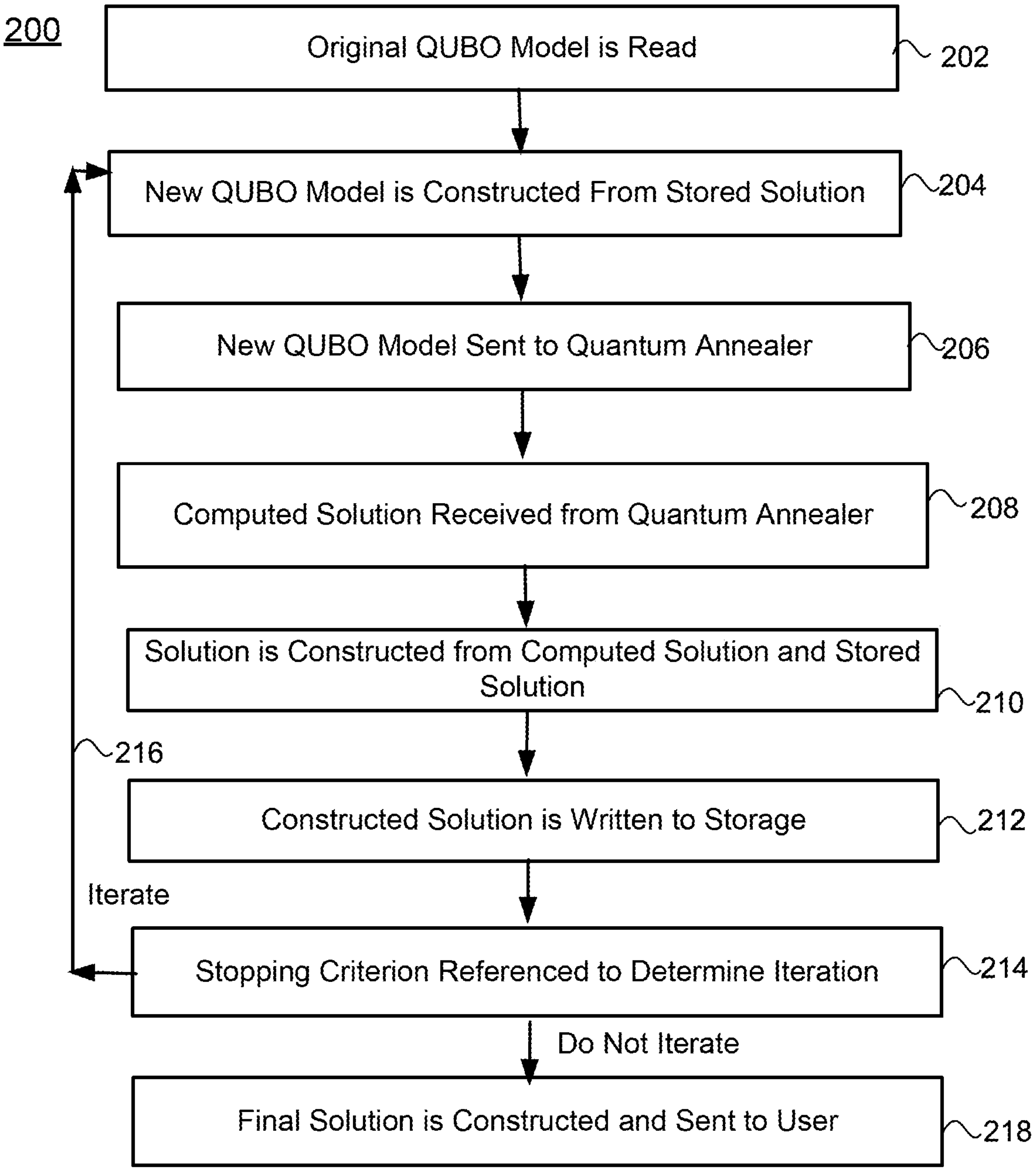
FIG. 2 shows a simplified flow diagram of a method according to an embodiment.

FIG. 2 is a flow diagram of a method 200 according to an embodiment. At 202, an original first Quadratic Unconstrained Binary Optimization (QUBO) model comprising a first matrix is read.

At 204, a second QUBO model comprising a second matrix is constructed from the first QUBO model and an initial solution. At 206 the second QUBO model is sent to a quantum annealer;

At 208, a first computed solution is received from the quantum annealer in response to sending the second QUBO model. At 210, a first intermediate solution is constructed from the initial solution and the first computed solution.

At 212, the first intermediate solution is stored in a non-transitory computer readable storage medium. At 214, a stopping criterion is referenced to determine whether an iteration should be performed.

If another iteration is to be performed, the method returns 216 to 204 to construct a another new model from the original model and the latest solution. If no iteration is determined to be performed, at 218 a final solution is constructed from the latest solution.

Further details regarding iterative quantum annealing according to various embodiments, are now provided in connection with the following derivation.

First, for the sake of simplicity, let us introduce modular 2 addition:

$$\oplus: \{0,1\}\times\{0,1\}\to\{0,1\} \text{ with } x\oplus y = \begin{cases} 0 & x=y \\ 1 & x\neq y \end{cases}.$$

Now, for a QUBO, defined by the matrix:

$$Q\in\mathbb{R}^{n,n}$$

let $x\in\{0,1\}^n$ be the optimal solution. Then for any $y\in\{0,1\}^n$, there exists an $z\in\{0,1\}^n$ such that $x=y\oplus z$ and z is a solution of the following optimization problem:

$$\min\{(y\oplus z)^T Q(y\oplus z): z\in\{0,1\}^n\}.$$

This optimization problem can be transformed into a QUBO. That is, there exists a $\tilde{Q}\in\mathbb{R}^{n,n}$, such that z is a solution for:

$$\min\{z^T\tilde{Q}z: z\in\{0,1\}^n\}.$$

We will now construct the matrix $\tilde{Q}$. First, we partition the indices $I=\{1, \ldots n\}$:

$$I_0 := \{i\in I: y_i=0\} \text{ and } I_1 := \{i\in I: y_i=1\}.$$

With $1\oplus z=1-z$, we get:

$$(y\oplus z)^T Q(y\oplus z) = \sum_{i\in I^0}\sum_{j\in I^0} Q_{ij}z_iz_j + \sum_{i\in I^0}\sum_{j\in I^1} Q_{ij}z_i(1-z_j) + \sum_{i\in I^1}\sum_{j\in I^0} Q_{ij}(1-z_i)z_j + \sum_{i\in I^1}\sum_{j\in I^1} Q_{ij}(1-z_i)(1-z_j).$$

Because of $z_i\in\{0,1\}$, we have $$z_i = z_i^2$$

and therefore:

$$z_i(1-z_j) = z_i^2 - z_iz_j,$$
$$(1-z_i)z_j = z_j^2 - z_iz_j,$$
$$(1-z_i)(1-z_j) = 1 - z_i^2 - z_j^2 + z_iz_j.$$

Hence, $(y\oplus z)^T Q(y\oplus z)=$ $$\sum_{i\in I^0}\sum_{j\in I^0} Q_{ij}z_iz_j - \sum_{i\in I^0}\sum_{j\in I^1} Q_{ij}z_iz_j + \sum_{i\in I^0}\left(\sum_{j\in I^1} Q_{ij}\right)z_i^2 -$$

-continued $$\sum_{i\in I^1}\sum_{j\in I^0} Q_{ij}z_iz_j + \sum_{j\in I^0}\left(\sum_{i\in I^1} Q_{ij}\right)z_j^2 + \sum_{i\in I^1}\sum_{j\in I^1} Q_{ij}z_iz_j - \sum_{i\in I^1}\left(\sum_{j\in I^1} Q_{ij}\right)z_i^2 - \sum_{j\in I^1}\left(\sum_{i\in I^1} Q_{ij}\right)z_j^2 + \sum_{i\in I^1}\sum_{j\in I^1} Q_{ij}.$$

Now, let $A\in \mathbb{R}^{n,n}$ be defined as:

$$A_{ij} = \begin{cases} Q_{ij} & i\in I_0 \quad j\in I_0 \\ -Q_{ij} & i\in I_0 \quad j\in I_1 \\ -Q_{ij} & i\in I_1 \quad j\in I_0 \\ Q_{ij} & i\in I_1 \quad j\in I_1 \end{cases}$$

and let $B\in \mathbb{R}^{n,n}$ be a diagonal matrix, given by:

$$B_{kk} = \begin{cases} \sum_{i\in I_1} Q_{ik} + \sum_{j\in I_1} Q_{kj} & k\in I_0 \\ -\sum_{i\in I_1} Q_{ik} - \sum_{j\in I_1} Q_{kj} & k\in I_1 \end{cases}$$

Then, $\tilde{Q}=A+B$.

Setting $c=\Sigma_{i\in I^1}\Sigma_{j\in I^1}Q_{ij}$, we have:

$$(y\oplus z)^T Q (y\oplus z) = z^T\tilde{Q}z + c.$$

In summary, for a given y and $z\in \operatorname{argmin}\{z^T\tilde{Q}z : z\in\{0,1\}^n\}$, we have $$y\oplus z\in \operatorname{argmin}\{x^TQx : x\in\{\mathbf{0},\mathbf{1}\}^n\}.$$

For the sake of simplicity, we introduce the function:

$$T:\mathbb{R}^{n,n}\times\{0,1\}^n\rightarrow\mathbb{R}^{n,n}$$

That function constructs the new matrix based on a given matrix and a solution vector.

Given the notation already introduced, the function T maps Q and y to $\tilde{Q}$. That is:

$$T(Q,y)=A+B=\tilde{Q}.$$

Furthermore, for $Q\in \mathbb{R}^{n,n}$, the quantum annealing process is given by the function: $\alpha:\mathbb{R}^{n,n}\rightarrow\{0,1\}^n$, i.e., $\alpha:=\alpha(Q)$ is the solution of the annealing process.

An embodiment of a method for iterative annealing now can be stated as follows.

Given: A matrix $Q\in \mathbb{R}^{n,n}$ and an initial solution $x\in\{0,1\}^n$

Output: A good solution $x\in\{0,1\}^n$ for $\min\{x^TQx : x\in\{0,1\}^n\}$

Method:

1. Construct $\tilde{Q}\leftarrow T(Q,x)$
2. Apply quantum annealing $\Delta x\leftarrow\alpha(Q_{i+1})$
3. If $\Delta x^T\tilde{Q}\Delta x<0$ update x by $x\leftarrow x\oplus\Delta x$
4. Go to 1 or return x When using the zero vector $x=0^n$ as an initial solution, the first iteration is standard quantum annealing. From this, it follows that iterative annealing according to embodiments may offer benefits in terms of solution quality.

In 4. above, it is not specified when to go to 1. or return x. Examples of a possible stopping criterion could include but are not limited to:

fixed number of iterations, time limit, or no-progress clause.

When choosing $x\neq 0^n$, for example if x is computed by a classical heuristic, and using the stopping clause "True" (i.e., the solution of the first application of quantum annealing is returned), the method corresponds to warm start quantum annealing.

Example

An example of an embodiment of performing iterative quantum annealing is now described in connection with the capacitated vehicle routing problem. This assumes that a software program available from SAP SE of Walldorf, Germany, is charged with finding the best routes for moving packages.

In particular, there are several customers, each with a certain number of packages they want to have picked up. In addition, there is an existing fleet of trucks, each with a certain capacity.

The goal of the capacitated vehicle routing problem, is to pick up all of the packages, without overloading the trucks and at the same time minimizing travel time or distance.

Figure 3:
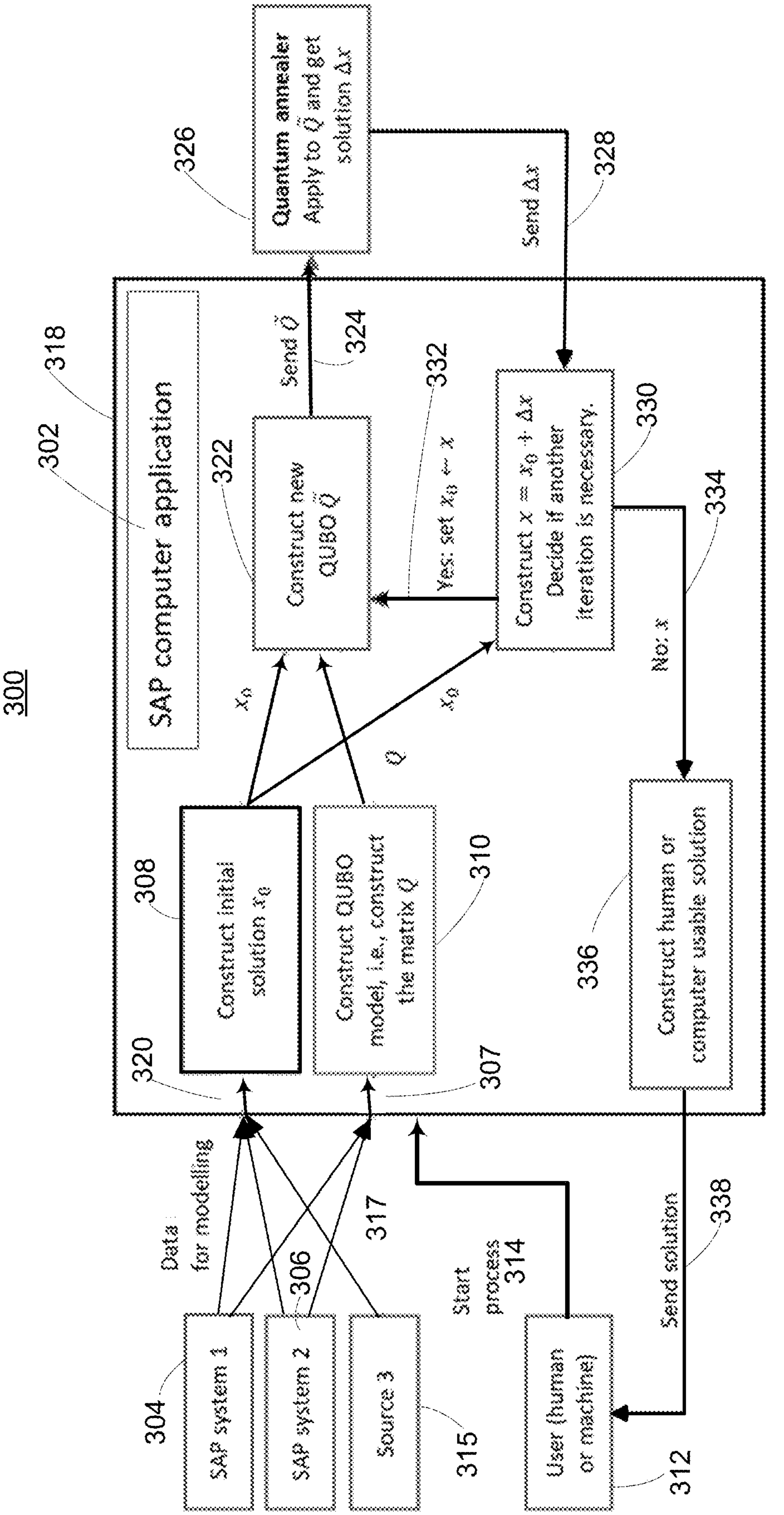
FIG. 3 shows an overview of a system according to an example.

FIG. 3 shows an overview of a system 300 according to an example. Here, the number of trucks and their respective capacities are known. Such values may be available to SAP Computer Application 302 from a first source 304 (e.g., SAP system 1).

Also accessible to the SAP application, are:

the customers;

customer locations;

customer demands distances and/or travel times from one costumer to another.

These values are available from a different source 306 (e.g., SAP system 2). Together, the data 307 that is available from the various sources can be used to construct the QUBO model.

In this example, an initial solution 308 could be a truck route from a previous day, and is also saved in one or several SAP systems. That is, routes from a previous day should be informative, as the delivery situation is not expected to change dramatically from day-to-day.

It is noted that a different type of initial solution could be used. For example, a shorter previous route could be available for reference as the initial solution to a longer route.

The QUBO model 310 represents the optimization problem that is to be solved by quantum annealing. Given an initial solution, embodiments can translate that solution into actual routes that the trucks can then execute.

As shown in FIG. 3, a user 312 (SAP user or system) starts 314 the procedure 1.-8. described below, based upon an interest in determining the truck routes for the present day.

1. From the SAP systems and additional source(s) 315, the data 316 for constructing the QUBO model is selected. This data is read 317 by the computing device 318 running the SAP application.
2. With the data selected in 1, the matrix Q representing the QUBO model is constructed.
3. From the SAP systems and/or additional source(s), the data 320 to construct the initial solution is selected. This data is read by the computing device running the application.
4. With the data that is selected and read in 3, the initial solution $x_0$ representing the QUBO model is constructed.
5. A new QUBO model 322 is then constructed from the original model at 2. and the initial solution at 4. Thus, the matrix $\tilde{Q}$ is constructed from Q and $x_0$ as previously described.

Note: in the mathematical derivation given above, $x_0$ simply represents the initial value of x. This is because we iteratively overwrite the initial solution.

Thus according to embodiments, the initial solution gets overwritten with an intermediate solution in each iteration. The intermediate solution is itself overwritten (or not) in producing the final solution at the conclusion of the procedure.

6. The QUBO model constructed in 5. is then sent 324 to the quantum annealer 326. That is, the QUBO model is sent from the computing device (on which the SAP application runs) to a computing device responsible for managing the quantum annealer.

The quantum annealer runs the QUBO represented by the matrix $\tilde{Q}$. The quantum annealer sends 328 its computed solution Δx back the computing device (on which the SAP application runs).

7. At 330, set $x=x_0 \oplus \Delta x$ that represents a new and optimized route. The solution Δx received from the quantum annealer tells if the initial routing should be changed in the following way:

if, for example, the i-th entry is 1 ($\Delta x_i=1$), then the entry i-th entry in $x_0$ in needs to change.

Thus if $(x_0)_i=0$, the new value will be $x_i=1$.

According to the current example, suppose that in one route, customer a is succeeded by customer b, and customer c is succeeded by customer d. Now, the Δx tells that the route should not go from a to b and from c to d, but rather from a to d and from c to b.

This would correspond to four (4) bit-flips:

two (2) for deselecting going from a to b and from c to d, and two (2) for selecting going from a to d and from c to b.

A decision now may be made whether the solution x is the final solution, or whether the solution x should be further improved. This can be based upon one or more stopping criteria, e.g., •a fixed number of iterations, •a time limit, and/or •a no-progress clause.

If the solution should be further improved, then at 332 the system goes back to step 5. Under these circumstances $x_0$ is set to be the x that was just computed in the previous iteration.

If, however, it is concluded that x is the final solution, then the procedure moves 334 to 8. below.

8. Lastly, at 336, the (mathematical) final solution x is converted to an actual routing for the vehicles. That routing is communicated 338 to the user.

Returning now to FIG. 1, there the particular embodiment is depicted with the engine as being located outside of the database. However, this is not required.

Rather, alternative embodiments could leverage the processing power of an in-memory database engine (e.g., the in-memory database engine of the HANA in-memory database available from SAP SE), in order to perform various functions. Examples of such functions can include, but are not limited to one or more of:

storing data read from source;

constructing initial solution;

constructing original model;

constructing new model from initial solution and computed solution;

constructing final solution;

storing (e.g., time, iteration, solution quality, and/or clause) information referenced by stopping criterion.

Figure 4:
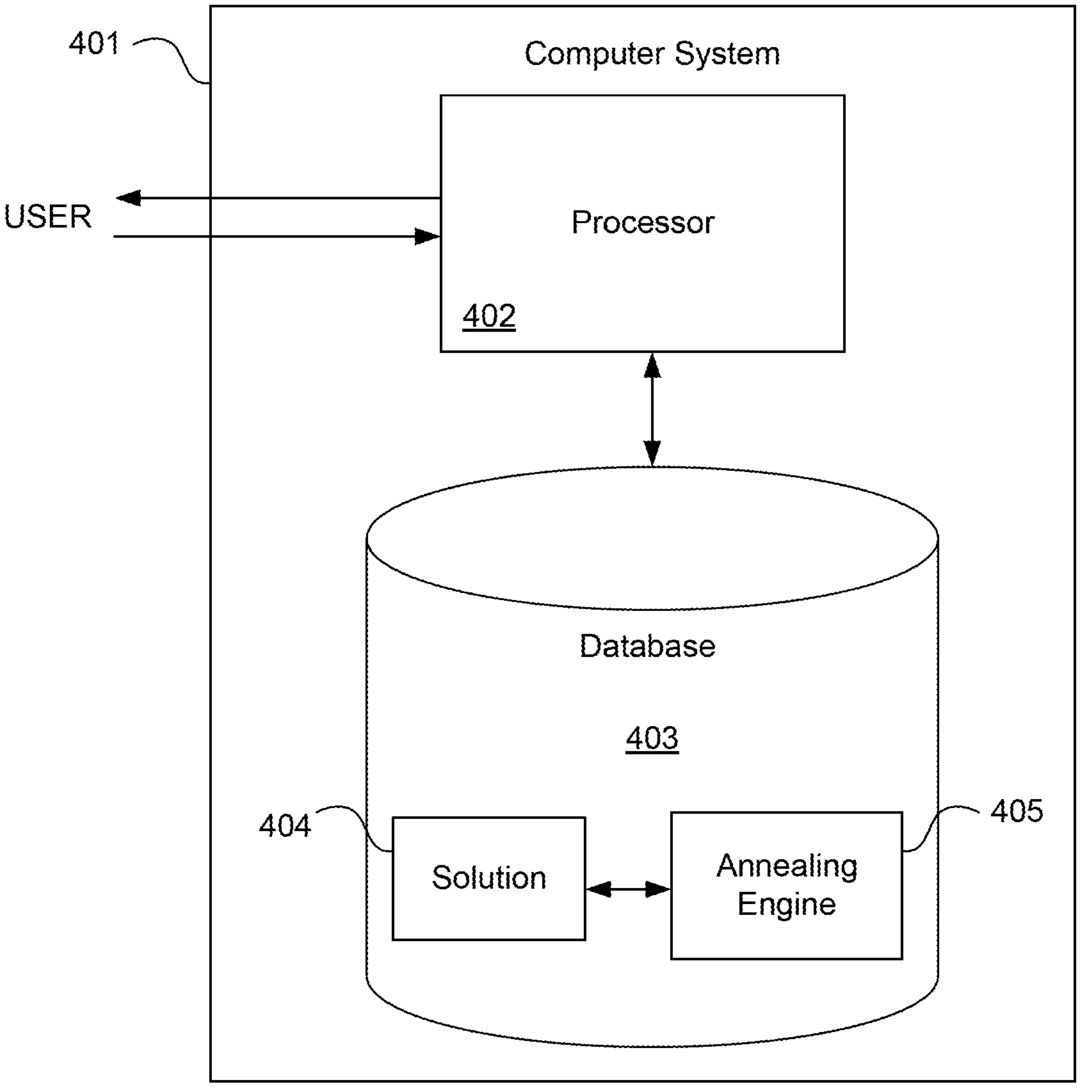
FIG. 4 illustrates hardware of a special purpose computing machine configured to implement iterative quantum anneal according to an embodiment.

Thus FIG. 4 illustrates hardware of a special purpose computing machine configured to perform iterative quantum anneal according to an embodiment. In particular, computer system 401 comprises a processor 402 that is in electronic communication with a non-transitory computer-readable storage medium comprising a database 403. This computer-readable storage medium has stored thereon code 405 corresponding to an annealing engine. Code 404 corresponds to a solution. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising: reading a first Quadratic Unconstrained Binary Optimization (QUBO) model comprising a first matrix;

constructing from the first QUBO model and an initial solution, a second QUBO model comprising a second matrix;

sending the second QUBO model to a quantum annealer;

receiving from the quantum annealer, a first computed solution in response to sending the second QUBO model;

constructing a first intermediate solution from the initial solution and the first computed solution; and writing the first intermediate solution to a non-transitory computer readable storage medium.

Example 2. The computer implemented system and method of Example 1 further comprising:

transforming the first intermediate solution into a final solution; and communicating the final solution to a user.

Example 3. The computer implemented system and method of Example 1 or 2 further comprising:

determining the first intermediate solution does not satisfy a stopping criterion;

constructing from the second QUBO model and the first solution, a third QUBO model;

sending the third QUBO model to the quantum annealer;

receiving a second computed solution from the quantum annealer in response to sending the third QUBO model;

constructing a second intermediate solution from the initial solution and the second computed solution; and overwriting the first intermediate solution with the second intermediate solution.

Example 4. The computer implemented system and method of Example 3 wherein the stopping criterion comprises at least one of a number of iterations and a time limit.

Example 5. The computer implemented system and method of Example 3 or 4 further comprising:

determining a solution quality of the first solution, wherein the stopping criterion comprises a no-progress clause referencing the solution quality.

Example 6. The computer implemented system and method of Example 1, 2, 3, 4, or 5 further comprising constructing the initial solution from data read from a source.

Example 7. The computer implemented system and method of Examples 1, 2, 3, 4, 5, or 6 further comprising constructing the first QUBO model from data read from a source.

Example 8. The computer implemented system and method of Examples 1, 2, 3, 4, 5, 6, or 7 wherein the quantum annealer comprises at least one of a digital annealer, a simulated annealer, and a classical solver.

Example 9. The computer implemented system and method of Examples 1, 2, 3, 4, 5, 6, 7, or 8 wherein:

an in-memory database engine of an in-memory database constructs the second QUBO model from the first QUBO model and the initial solution; and the non-transitory computer readable storage medium comprises the in-memory database.

Figure 5:
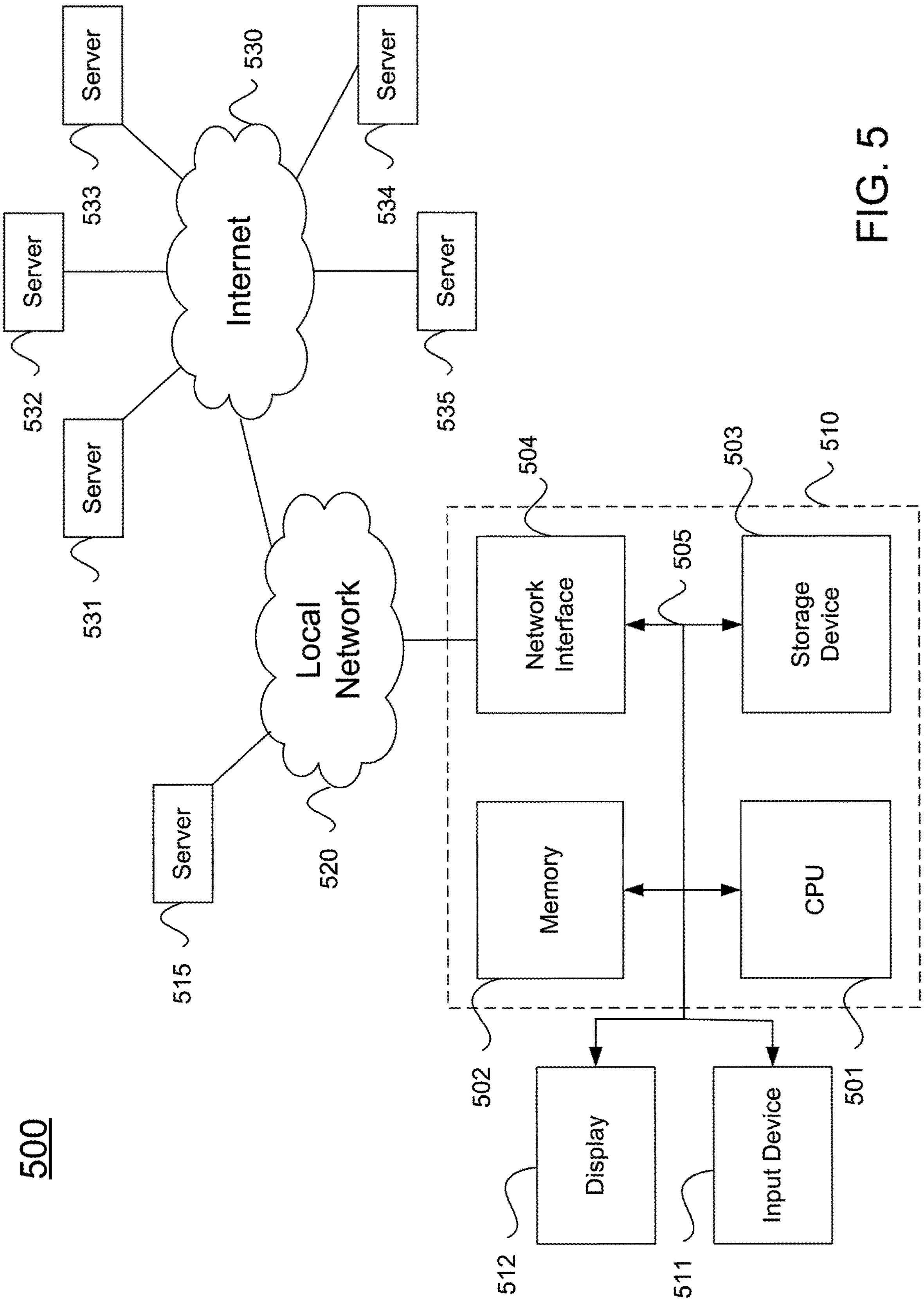
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a Light Emitting Diode (LED) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:

reading a first Quadratic Unconstrained Binary Optimization (QUBO) model comprising a first matrix;

obtaining an initial solution corresponding to the first QUBO model;

constructing, by an annealing engine and based on the first QUBO model and the initial solution, a second QUBO model configured to encode a delta relative to the initial solution, from the first QUBO model and an initial solution, a second QUBO model comprising a second matrix, wherein constructing the second QUBO model comprises applying a transformation function that maps the first matrix and the initial solution to a modified matrix representing a solution-space offset;

sending the second QUBO model to a quantum annealer;

receiving from the quantum annealer, a first computed solution in response to sending the second QUBO model;

constructing, by the annealing engine, a first intermediate solution from the initial solution and the first computed solution;

determining whether the first intermediate solution satisfies a stopping criterion; and in response to determining that the stopping criterion is not satisfied, iteratively: (i) overwriting the initial solution with the first intermediate solution, (ii) constructing an updated QUBO model based on the first intermediate solution and the first QUBO model, and (iii) re-invoking the quantum annealer using the updated QUBO model; and writing the first intermediate solution to a non-transitory computer readable storage medium.

2. The method of claim 1 further comprising:

transforming the first intermediate solution into a final solution; and communicating the final solution to a user.

3. The method of claim 1 further comprising:

determining the first intermediate solution does not satisfy a stopping criterion;

constructing from the second QUBO model and the first intermediate solution, a third QUBO model;

sending the third QUBO model to the quantum annealer;

receiving a second computed solution from the quantum annealer in response to sending the third QUBO model;

constructing a second intermediate solution from the initial solution and the second computed solution; and overwriting the first intermediate solution with the second intermediate solution.

4. The method of claim 3 wherein the stopping criterion comprises at least one of a number of iterations and a time limit.

5. The method of claim 3 further comprising:

determining a solution quality of the first intermediate solution, wherein the stopping criterion comprises a no-progress clause referencing the solution quality.

6. The method of claim 1 further comprising constructing the initial solution from data read from a source.

7. The method of claim 1 further comprising constructing the first QUBO model from data read from a source.

8. The method of claim 1 wherein the quantum annealer comprises at least one of a digital annealer, a simulated annealer, and a classical solver.

9. The method of claim 1 wherein:

an in-memory database engine of an in-memory database constructs the second QUBO model from the first QUBO model and the initial solution; and the non-transitory computer readable storage medium comprises the in-memory database.

10. A non-transitory computer readable storage medium embodying a computer program for performing a method, said method comprising:

reading a first Quadratic Unconstrained Binary Optimization (QUBO) model comprising a first matrix;

obtaining an initial solution corresponding to the first QUBO model;

constructing, by an annealing engine and based on the first QUBO model and the initial solution, a second QUBO model configured to encode a delta relative to the initial solution, from the first QUBO model and an initial solution, a second QUBO model comprising a second matrix, wherein constructing the second QUBO model comprises applying a transformation function that maps the first matrix and the initial solution to a modified matrix representing a solution-space offset;

sending the second QUBO model to a quantum annealer;

receiving from the quantum annealer, a first computed solution in response to sending the second QUBO model;

constructing, by the annealing engine, a first intermediate solution from the initial solution and the first computed solution;

determining whether the first intermediate solution satisfies a stopping criterion; and in response to determining that the stopping criterion is not satisfied, iteratively: (i) overwriting the initial solution with the first intermediate solution, (ii) constructing an updated QUBO model based on the first intermediate solution and the first QUBO model, and (iii) re-invoking the quantum annealer using the updated QUBO model; and writing the first intermediate solution to a non-transitory computer readable storage medium.

11. The non-transitory computer readable storage medium of claim 10, wherein the stopping criterion comprises at least one of a number of iterations and a time limit.

12. The non-transitory computer readable storage medium as in claim 10 wherein the method further comprises:

determining a solution quality of the first intermediate solution, wherein the stopping criterion comprises a no-progress clause referencing the solution quality.

13. The non-transitory computer readable storage medium as in claim 10 wherein the method further comprises constructing the initial solution from data read from a source.

14. The non-transitory computer readable storage medium as in claim 10 wherein the method further comprises constructing the first QUBO model from data read from a source.

15. A computer system comprising:

one or more processors;

a software program, executable on said computer system, the software program configured to cause an in-memory database engine of an in-memory database to:

read from the in-memory database, a first Quadratic Unconstrained Binary Optimization (QUBO) model comprising a first matrix;

obtain an initial solution corresponding to the first QUBO model;

construct, by an annealing engine and based on the first QUBO model and the initial solution, a second QUBO model configured to encode a delta relative to the initial solution, from the first QUBO model and an initial solution, a second QUBO model comprising a second matrix, wherein constructing the second QUBO model comprises applying a transformation function that maps the first matrix and the initial solution to a modified matrix representing a solution-space offset;

send the second QUBO model to a quantum annealer;

receive from the quantum annealer, a first computed solution in response to sending the second QUBO model;

construct, by the annealing engine, a first intermediate solution from the initial solution and the first computed solution;

determine whether the first intermediate solution satisfies a stopping criterion; and in response to determining that the stopping criterion is not satisfied, iteratively: (i) overwrite the initial solution with the first intermediate solution, (ii) construct an updated QUBO model based on the first intermediate solution and the first QUBO model, and (iii) re-invoke the quantum annealer using the updated QUBO model; and write the first intermediate solution to the in-memory database.

16. The computer system of claim 15 wherein the in-memory database engine is further configured to:

determine the first intermediate solution does not satisfy a stopping criterion;

construct from the second QUBO model and the first intermediate solution, a third QUBO model;

send the third QUBO model to the quantum annealer;

receive a second computed solution from the quantum annealer in response to sending the third QUBO model;

construct a second intermediate solution from the initial solution and the second computed solution; and overwrite the first intermediate solution with the second intermediate solution.

17. The computer system of claim 16 wherein the stopping criterion comprises at least one of a number of iterations, a time limit, and a stopping criterion.

18. The computer system as in claim 15 wherein the in-memory database engine is further configured to construct a final solution from an intermediate solution.

19. The computer system as in claim 15 wherein the in-memory database engine is further configured to construct the initial solution from data read from a source.

20. The computer system as in claim 15 wherein the in-memory database engine is further configured to construct the first QUBO model from data read from a source.

* * * * *